United States Patent

Ichikawa (10) Patent No.: US 9,444,951 B2
(45) Date of Patent: Sep. 13, 2016

(54) IMAGE FORMING APPARATUS AND IMAGE FORMING METHOD WHICH DETERMINE PRINTED MATTER CONDITION BASED ON CAMERA-CAPTURED IMAGE

(71) Applicant: KYOCERA Document Solutions Inc., Osaka (JP)

(72) Inventor: Daisuke Ichikawa, Osaka (JP)

(73) Assignee: KYOCERA Document Solutiuons Inc., Osaka (JP)

( * ) Notice: Subject to any disclaimer, the term of this patent is extended or adjusted under 35 U.S.C. 154(b) by 0 days.

(21) Appl. No.: 14/815,206

(22) Filed: Jul. 31, 2015

(65) Prior Publication Data

US 2016/0037002 A1 Feb. 4, 2016

(30) Foreign Application Priority Data

Jul. 31, 2014 (JP) ................................. 2014-156100

(51) Int. Cl.
*H04N 1/00* (2006.01)

(52) U.S. Cl.
CPC ...... *H04N 1/00323* (2013.01); *H04N 1/00251* (2013.01); *H04N 1/00726* (2013.01); *H04N 1/00734* (2013.01); *H04N 1/00771* (2013.01)

(58) Field of Classification Search
CPC ..................... H04N 1/00323; H04N 1/00251; H04N 1/00771; H04N 1/00726; H04N 1/00734

USPC ..................................... 358/1.12, 1.15, 1.16
See application file for complete search history.

(56) References Cited

U.S. PATENT DOCUMENTS

| | | | | |
|---|---|---|---|---|
| 7,106,461 B2* | 9/2006 | Kakigi | ............... | H04N 1/00132 348/207.2 |
| 7,243,045 B2* | 7/2007 | Uwatoko | ............... | G03G 15/55 399/9 |
| 2001/0022662 A1* | 9/2001 | Hosoda | .............. | G03G 15/6538 359/1.9 |
| 2009/0180163 A1* | 7/2009 | Cornell | ............. | H04N 1/00002 358/498 |
| 2015/0326752 A1* | 11/2015 | Hayasaki | ............. | H04N 1/4074 358/522 |

FOREIGN PATENT DOCUMENTS

JP 2004-072233 A 3/2004

* cited by examiner

*Primary Examiner* — Allen H Nguyen
(74) *Attorney, Agent, or Firm* — Hawaii Patent Services; Nathaniel K. Fedde; Kenton N. Fedde (57) ABSTRACT

Provided is an image forming apparatus that is capable of solving a problem caused at a discharge part in quick, effective manner. The discharge part is for placing a discharged printed matter. A camera captures an image of a sheet stacking surface of the discharged printed matter. A delivery decision processing part determines, based on the image captured by the camera, a current condition of the discharged printed matter that is placed in the discharge part. Then, the delivery decision processing part takes a specified action in response to the determination result.

5 Claims, 6 Drawing Sheets

IMAGE FORMING APPARATUS AND IMAGE FORMING METHOD WHICH DETERMINE PRINTED MATTER CONDITION BASED ON CAMERA-CAPTURED IMAGE

INCORPORATION BY REFERENCE

This application is based on and claims the benefit of priority from Japanese Patent Application No. 2014-156100 filed on Jul. 31, 2014, the contents of which are hereby incorporated by reference.

BACKGROUND

The present disclosure relates to an image forming apparatus and an image forming method which allow for discharging a printed matter to a discharge part for placing the printed matter therein.

In some image forming apparatuses, a printed matter is discharged to an in-body sheet discharge part that is formed between a manuscript reading part and a main body. In a case of discharging the printed matter to the in-body sheet discharge part, it is difficult to detect a current condition of the printed matter. For this reason, a technology to provide a camera in the in-body discharging part is proposed. In this technology, the condition of the printed matter is in the in-body discharge part which is captured by the camera is displayed on an operation part.

SUMMARY

An image forming apparatus according to the present disclosure includes a discharge part, a camera, and a delivery decision processing part. The discharge part is configured to place therein a discharged printed matter. The camera is configured to capture an image of a stacking side of the discharge part. The delivery decision processing part is configured to determine a condition of the printed matter placed in the discharged par based on the image captured by the camera. The delivery decision processing part is also configured to take a specified action in response to a result of the determination. A method of forming an image according to the present disclosure is to be performed by an image forming apparatus, the image forming apparatus including a discharge part that is configured to place therein a discharged printed matter and a camera that is configured to capture an image of a stacking side of the discharge part. A condition of the printed matter is determined that is placed in the discharged part based on the image captured by the camera. Then, a specified action is taken in response to a result of the determination.

DETAILED DESCRIPTION

Next, an exemplary embodiment of the present invention will be detailed with reference to the attached drawings.

Figure 1:
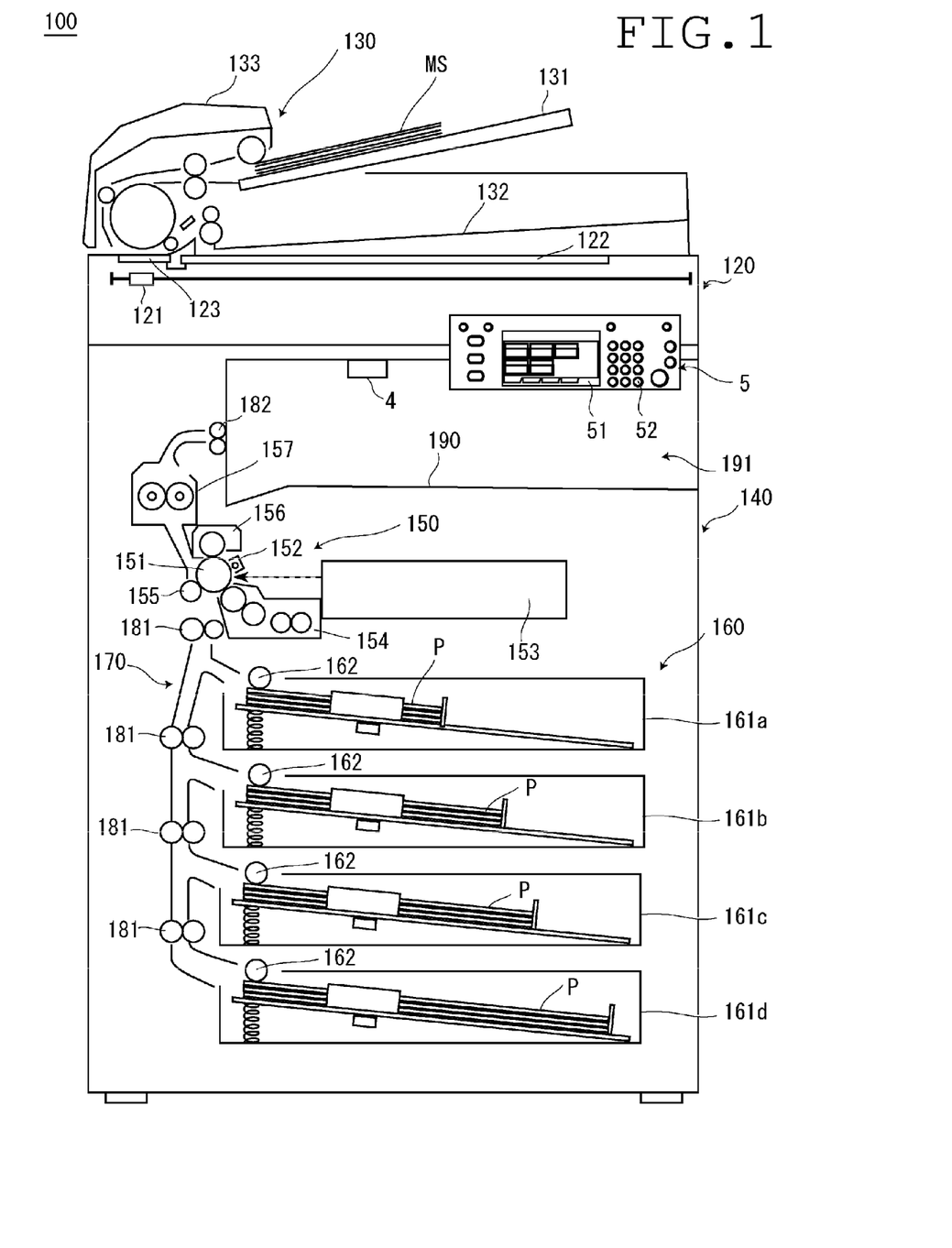
FIG. 1 is a schematic cross-sectional view of an image forming apparatus according to the present disclosure.

An image forming apparatus 100 according to an exemplary embodiment of the present disclosure is a combined machine that has copying, printing, scanning, and other functions. With reference to FIG. 1, the image forming apparatus 1 includes a manuscript reading part 120, a manuscript conveyance part 130, and a printing part 140. The manuscript reading part 120 is positioned at an upper side of the printing part 140. The manuscript conveyance part 130 is located at an upper side of the on the manuscript reading part 120.

At a front surface side of the image forming apparatus 100, there is provided an operation panel 5. The operation panel 5 is provided with a touch panel 51 and a plurality of manual operation buttons 52. A user is capable of performing various setting of the image forming apparatus 100 by inputting an instruction using the operation panel 5 manipulated by the user. In addition, the user is capable of implementing functions that include, for example, an image forming function. The touch panel 51 is provided on a display surface of a display part that displays various operation keys that accept an operation input. The touch panel 51 detects an input by pressing with an operator's fingertip accepts, a stylus pen, or the like. The touch panel 51 outputs a signal corresponding to a position at which the input is detected. Thus, the touch panel 51 accepts an operation through an operation key that is displayed on the display part. The manual operation buttons 52 are provided, and they include a START button, STOP/CLEAR button, RESET button, and a numeric keypad. The START button is ordered by the user to start an image formation. The STOP/CLEAR button is used to stop forming an image or the like. The RESET button is used when the various setting of the image forming apparatus 100 is brought into default conditions.

The manuscript reading part 120 includes a scanner 121, a platen glass 122, and a manuscript reading slit 123. The scanner 121 is made up of components that include, for example, an exposure lamp and an optical sensor. The scanner 121 is configured to be movable along a conveying direction of a manuscript MS. The platen glass 122 is a platen that is formed of a transparent member such as glass. The manuscript reading slit 123 includes a slit that extends in a direction orthogonal to the conveying direction of the manuscript in the manuscript conveyance part 130.

The manuscript conveyance part 130 is configured to pivot. Upward pivoting of the manuscript conveyance part 130 causes an upper face of the platen glass 122 to expose upwardly, thereby allowing the manuscript MS to be placed on the platen glass 122. In a case of reading the manuscript MS that has been placed on the platen glass 122, the scanner 121 is moved to a position that is in opposition to the platen glass 122. Thereafter, the scanner 121 reads the manuscript MS by scanning the same that has been placed on the platen glass 122 to capture an image data of the manuscript MS.

In addition, the manuscript conveyance part 130 includes a manuscript mounting part 131, a manuscript discharge part 132, and a manuscript transport mechanism 133. The manuscript transport mechanism 133 feeds the manuscripts MS placed on the manuscript mounting part 131 successively in a sheet-by-sheet manner. The manuscript is fed to a position that is in opposition to the manuscript reading slit 123 of the manuscript reading part 120 and then is discharged to the manuscript discharge part 132. In a case of reading the manuscript MS that has been fed by the manuscript conveyance part 130, the scanner 121 is moved to the position that is in opposition to the manuscript reading slit 123. The scanner 121, which is being in synchronization with the transportation of the manuscript MS by the manuscript conveyance part 130, reads the manuscript MS through the manuscript reading slit 123. Thereby, the scanner 121 acquires an image data of the manuscript MS.

The printing part 140 includes an image formation part 150, a paper conveyance part 160, a paper carrying path 170, conveying rollers 181, ejecting rollers 182, and an in-body discharging tray 190. The in-body discharging tray 190 constitutes a discharging part into which a printed matter is placed. The in-body discharging tray 190 is provided within a delivery space 192 that is defined between the manuscript reading part 120 and the printing part 14.

The paper conveyance part 160 includes a plurality of sheet paper cassettes 161a-161d, and a plurality of paper feeding rollers 162. Each of the sheet paper cassettes 161a-161d house therein recording papers P. The paper feeding rollers 162 feeds the recording papers P to the paper carrying path 170 in a sheet-by-sheet manner from the sheet paper cassettes 161a-161d. The paper feeding rollers 162, the paper conveying rollers 181, and the paper ejection rollers 182, in combination, act as a conveying part. This causes the recording paper P to be carried. The recording paper P is carried by the conveying rollers 181 to the image formation part 150.

The image formation part 150 includes a photo conductor drum 151, a charging part 152, an exposure part 153, a developing part 154, a transfer part 155, a cleaning part 156, and a fixing part 157. The exposure part 153 is an optical unit that is provided with a laser device, a mirror, and other elements. The exposure part 153 outputs a laser beam based on the image data. The exposure part 153 exposes a surface of the photo conductor drum 151 which is electrically charged by the charging part 152. Thus, the exposure part 153 forms an electrostatic latent image on the surface of the photo conductor drum 151. The developing part 154 is a unit for developing the electrostatic latent image formed on the surface of the photo conductor drum 151 using a toner. The developing part 154 forms a toner image on the photoconductor drum 151. The transfer part 155 causes the toner image that is formed by the developing part 154 on the photo conductive drum 151 to transfer on to the recording paper P. The fixing part 157 heats the recording paper P on which the toner image that is transferred by the transfer part 155. Thus, the fixing part 157 fixes the toner image on the recording paper P.

The recording paper P on which a record is applied is guided by the ejecting rollers 182 to be outputted, as a printed matter, into the in-body discharging tray 190. At an upper portion of the delivery space 191, there is provided a camera 4 that is configured to capture an image of the in-body discharging tray 190. The camera 4 focuses a sheet stacking surface side of the in-body discharging tray 190. In the present image forming device 100, the recording paper P is discharged into the in-body discharging tray 190 such that a rear surface of the recording paper P is being turned up. For this reason, the camera 4 captures an image of the rear surface of the manuscript reading part 120.

Figure 2:
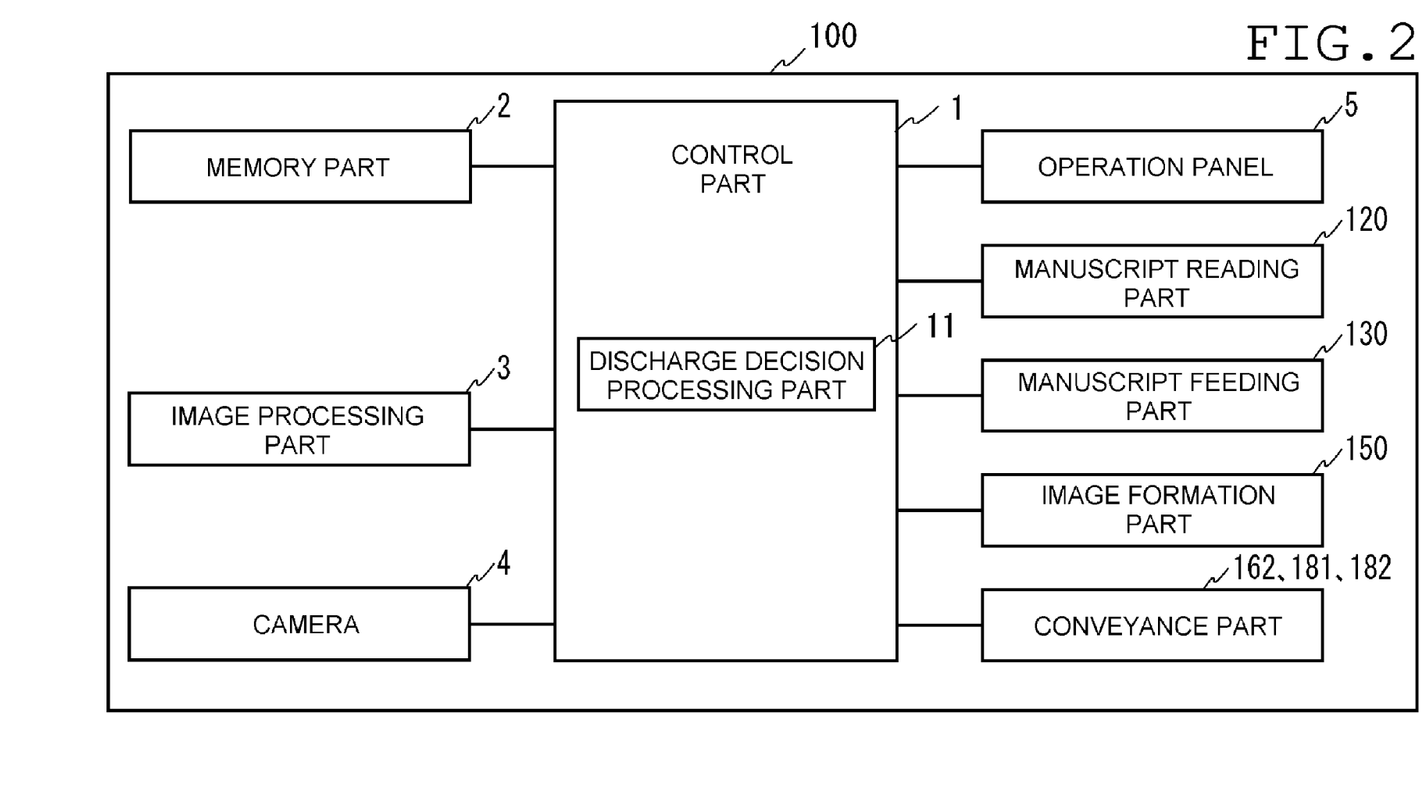
FIG. 2 is a block diagram that is indicative of a configuration of the image forming apparatus that is illustrated in FIG. 1.

FIG. 2 illustrates a schematic configuration of the image forming apparatus 100. The aforementioned camera 4, the operation panel 5, the manuscript reading part 120, the manuscript conveyance part 130, the image formation part 150, and the conveying part (paper feed rollers 162, conveying rollers 181, and ejecting rollers 182) are connected to a control part 1. An operation of each part is controlled by the control part 1. In addition, the control part 1 is connected with a memory part 2 and an image processing part 3.

The memory part 2 is a non-transitory recording medium. The memory part 2 stores an image data that is obtained by causing the manuscript reading part 12 to read a manuscript.

The image processing part 3 performs a specific image process with regard to the image data. For example, the image processing part 3 performs a zooming process and image improving processes that include, for example, density adjustment and tone adjustment.

The control part 1 is an information processing unit such as a microprocessor or microcomputer that is provided with a non-transitory storage medium. The storage medium stores a control program for the control of operation of the image forming apparatus 100. The control part 1 reads out and expands the control program stored in the storage medium. Thereby, the control part 1 controls the entire apparatus in response to a specified instruction that has been inputted from the operation panel 5. In addition, the control part 1 determines a current condition or state of a printed matter that has been discharged into the in-body discharging tray 190. Thus, the control part acts as a discharge decision processing part 11. The discharge decision processing part 11 will take a specified action depending on a determined result.

Figure 3A:
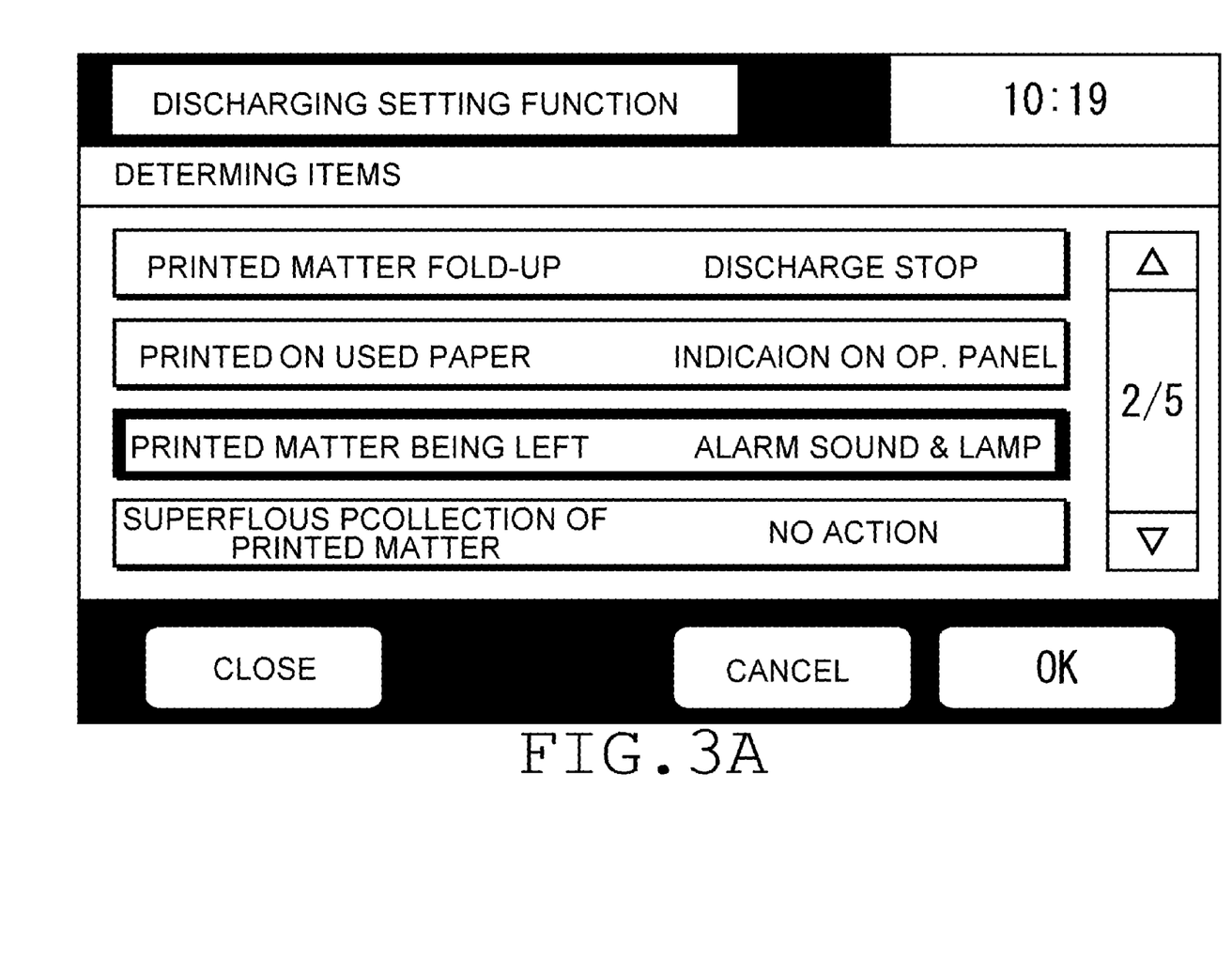
FIG. 3A is an example of setting screen of a sheet discharging function list.
Figure 3B:
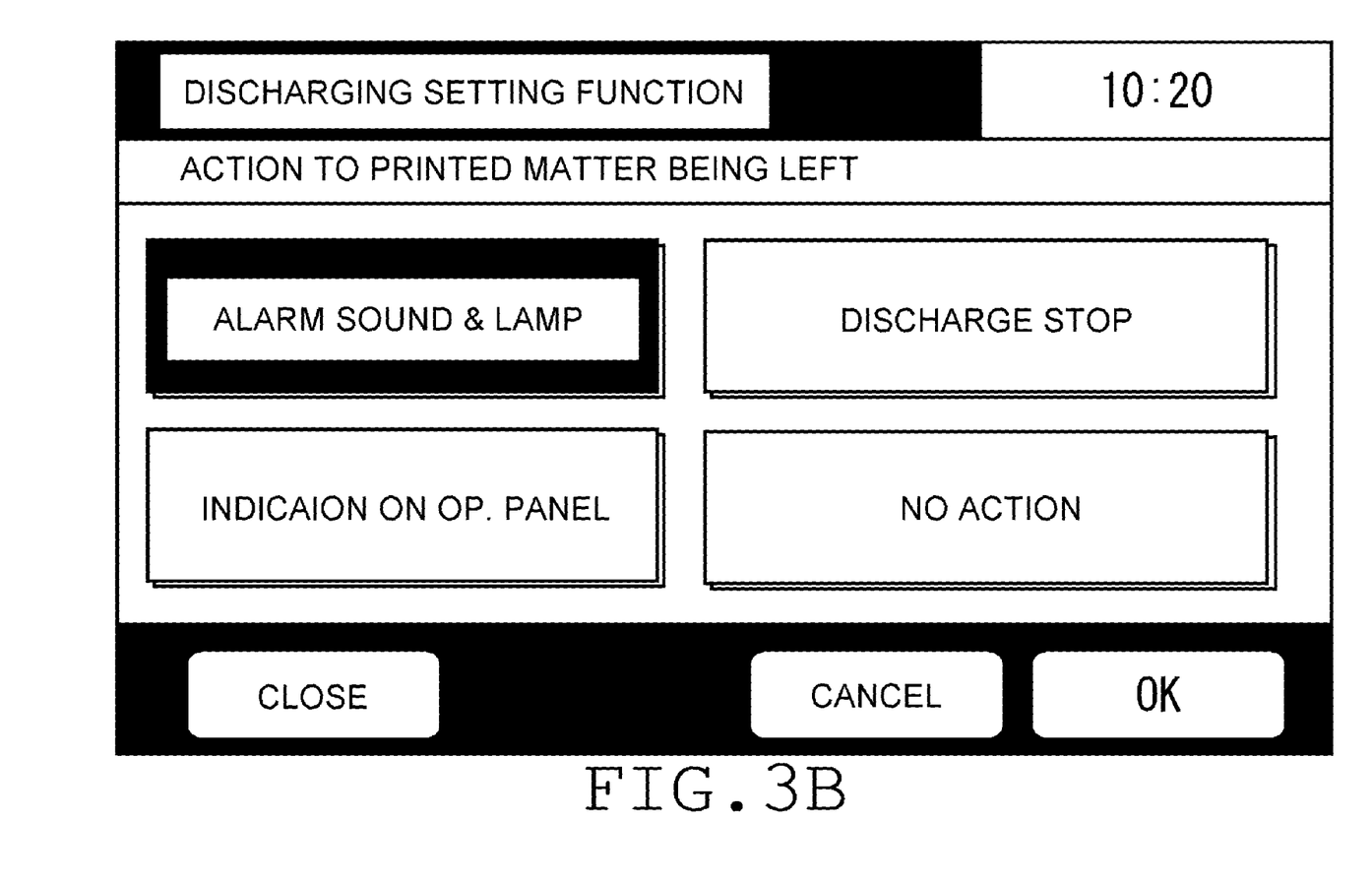
FIG. 3B is another example of setting screen of a sheet discharging function list.

For example, as illustrated in FIG. 3A, regarding the condition of the discharged printed matter into the in-body discharging tray 190, a discharging function setting screen provides determining items including "FOLDING-UP OF PRINTED MATTER", "PRINTING ON USED PAPER", "PRINTED MATTER BEING LEFT", and "SUPERFLUOUS COLLECTION OF PRINTED MATTER". For each of the determining items, an action is set which causes the image forming apparatus 100 to perform a corresponding operation. As indicated in FIG. 3B, as the action, a user is allowed to select any either one of "ALARM SOUND & ALARM LAMP", "INDICAION ON OPERATION PANEL", "DISCHARGE STOP", and "NO ACTION". In a case where "ALARM SOUND & ALARM LAMP" is set, the action will issue an alarm sound and light an alarm lamp. In case of setting "INDICAION ON OPERATION PANEL", the action will display, on the operation panel 5, a message that is indicative of the current condition of the printed matter. If "DISCHARGE STOP" is set, the action will cause the on-going job to stop. In case of setting "NO ACTION", no actions are taken that are associated with "ALARM SOUND & ALARM LAMP", "INDICAION ON OPERATION PANEL", and "DISCHARGE STOP". It is to be noted that instead of both of the alarm sound and the alarm lamp, either one of the alarm sound and the alarm lamp is available. For each of the determining items, it may be possible to select at least two of "ALARM SOUND & ALARM LAMP", "INDICAION ON OPERATION PANEL", and "DISCHARGE STOP".

Figure 4:
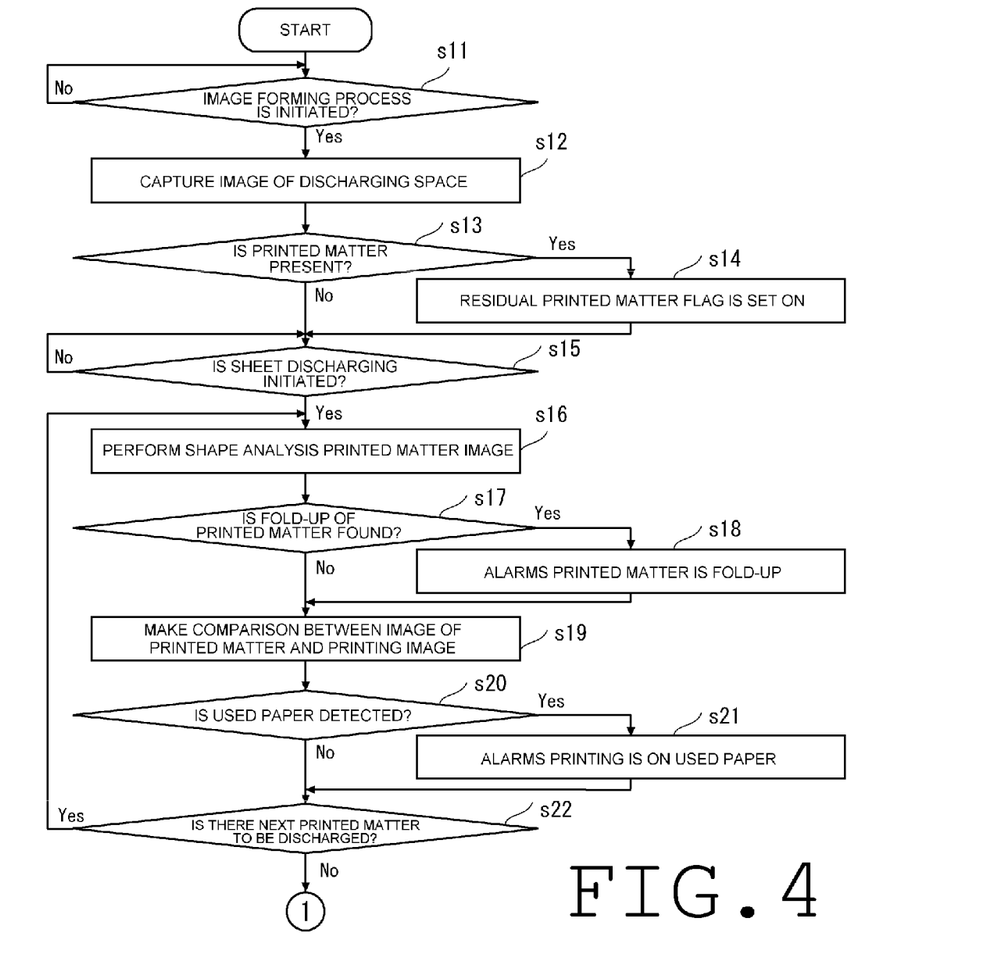
FIG. 4 is a flow-chart indicating a flow of processes that are performed by a delivery decision processing part shown in FIG. 2.
Figure 5:
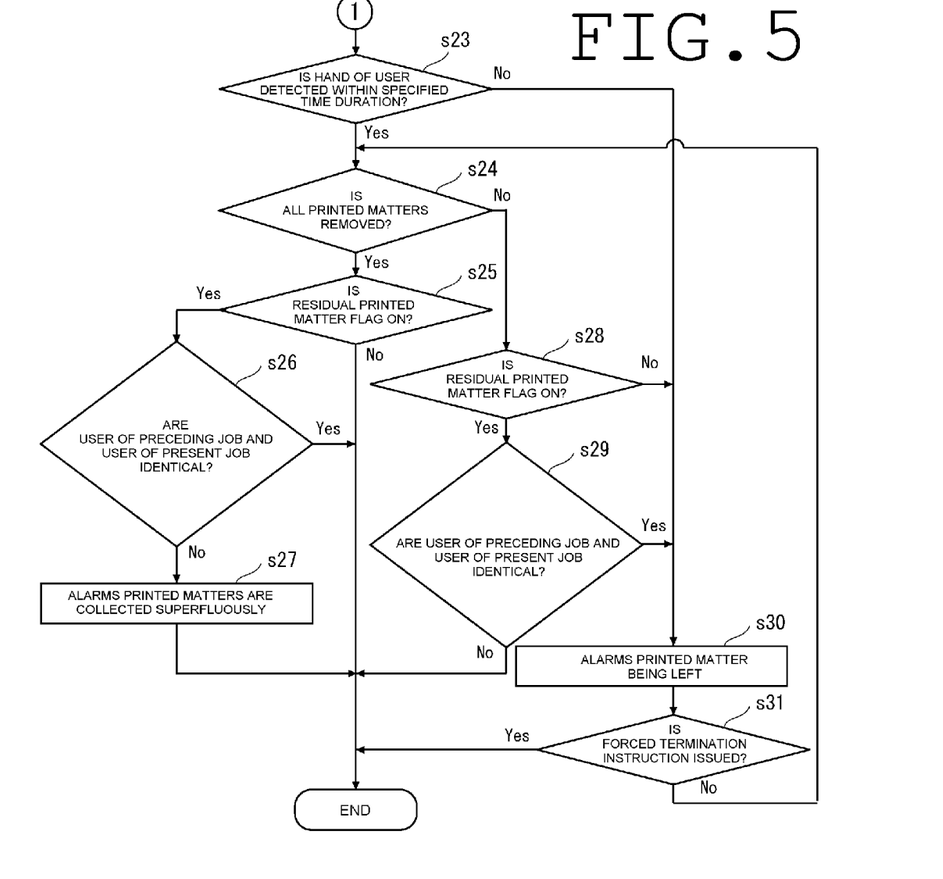
FIG. 5 is a flow-chart indicating another flow of processes that are performed by the delivery decision processing part shown in FIG. 2.

With reference to FIGS. 4 and 5, a flow of process that is performed by a discharge decision processing part 11 will be described in greater detail. It is to be noted that for each of the determining items of "FOLD-UP OF PRINTED MATTER", "PRINTING ON USED PAPER", "PRINTED MATTER BEING LEFT", and "SUPERFLUOUS COLLEC- TION OF PRINTED MATTER", "ALARM SOUND & ALARM LAMP" is set. This is for facilitating an explanation.

As illustrated in FIG. 4, the discharge decision processing part 11 waits until an image forming process is initiated (Step s11). When the image forming process is initiated (Yes in Step s11), the discharge decision processing part 11 causes the camera to initiate capturing the image of the in-body discharging tray 190 (Step s12). Then, the discharge decision processing part 11 determines whether or not there is a printed matter that has been left in the in-body discharging tray 190 (Step s13). It is determined that there is a residual printed matter if a printed matter of the preceding job or the like is left intentionally or grossly. If no residual printed matter is found (No in Step s13), the control goes to Step s15. If a residual printed matter is found (YES in Step s13), a residual printed matter flag is set ON (Step s14) and the control goes to Step s15. The residual printed matter flag may be stored in a ROM (not shown) or another memory device.

Next, the discharge decision processing part 11 determines whether or not a sheet discharging is initiated (Step s15). If the sheet discharging is not initiated (NO in Step s15), the control returns to Step s15. When the sheet discharging is initiated (YES in Step s15), the discharge decision processing part 11 makes a shape analysis of an printed matter image that is a captured image of the printed matter that has been discharged (Step s16). The discharge decision processing part 11 determines whether or not a fold-up of the printed matter is found (Step s17). For example, in a case where the shape of a printed matter is not an allowable or acceptable rectangle, such a printed matter may be regarded as a fold-up printed matter.

If no fold-up of the printed matter is found (NO in Step s17), the control goes to Step s19. If a fold-up of the printed matter is found (YES in Step s17), the discharge decision processing part 11 alarms, via the alarm sound and/or alarm lamp, that the printed matter is fold-up (Step s18). This makes the user to recognize the fold-up of the printed matter. In addition, the discharge decision processing part 11, based on the understanding that a jam condition of the printed matter brings the fold-up of the printed matter, may alarm that the printed matter has been jammed.

Next, the discharge decision processing part 11 makes a comparison between an image of the printed matter and a printing image (Step s19) to determine whether or not a used paper is detected (Step s20). If the recording paper P whose one surface is a used or printed surface is used for printing on the other surface, the used or printed surface is defined as a reverse side surface. In such a case, the printed matter is discharged into the in-body discharging tray 190 with the used or printed surface turned up and an image of the used or printed surface is captured by the camera 4. In a case of a single side printing, a printing image of the reverse side surface is an image of a blank sheet surface. Regarding the both side printing, the printing image of the reverse side surface is identical with the user prepared printing image. Thus, the discharge decision processing part 11 makes a comparison between the image of the printed matter and a printing image that corresponds to the reverse side surface. If the result indicates a discrepancy, the discharge decision processing part 11 can conclude that printing on a used paper is detected. If coincident, the discharge decision processing part 11 can conclude that printing on a used paper is not detected.

If no reverse-side paper is detected (NO in Step s20), the control goes to Step s22. If the printed matter is found to be printing on a used paper (YES in Step s20), the discharge decision processing part 11 alarms, via the alarm sound and/or alarm lamp, that printing is on a used paper (Step s21) and the control goes to Step s22. This makes the user to recognize the printing on the used paper. In addition, it is not necessary for the discharge decision processing part 11 to issue an alarm whenever the printed matter is found to be fold-up and/or printing on a used paper. That is to say, the discharge decision processing part 11 is allowed, after discharging all printed matters, to issue an alarm that the printed matter is found to be fold-up and/or printing on a used paper.

Subsequently, the discharge decision processing part 11 determines whether or not there is a next printed matter to be discharged (Step s22). If the result is true (YES in Step s22), the discharge decision processing part 11 repeats the process of Steps s16 through s22.

To the contrary, in a case where no next printed matter to be discharged is found (NO in Step 22) or all the printed matters have been discharged, as shown in FIG. 5, the discharge decision processing part 11 determines whether or not a hand of the user is detected within a specified time duration on the basis of the captured image (Step s23). If the result is false (NO in Step s23), the printed matter has been left. For this reason, the discharge decision processing part 11 alarms, via the alarm sound and/or alarm lamp, that the printed matter is left (Step s30).

Next, the discharge decision processing part 11 determines whether or not whether or not a forced termination instruction is issued (Step s31). If the forced termination instruction is issued (YES in Step s31), this routine is terminated. If no forced termination instruction is issued (NO in Step s31), the process of Steps s24 through s31 is repeated.

On the other hand, if the hand is detected within the specified time duration (YES in Step s23), the discharge decision processing part 11 determines whether or not all the printed matters have been removed (Step s24).

If all the printed matters have been removed (YES in Step s24), the discharge decision processing part 11 determines whether or not the residual printed matter flag is ON (Step s25). If the result is false, (NO in Step s25), it is possible to understand that the user has collected all the printed matters that are associated with the present job. Thus, this routine is terminated.

If the residual printed matter flag is ON (YES in Step s25), the discharge decision processing part 11 regards that the residual printed matter is a printed matter that has was discharged at the preceding job. Then, the discharge decision processing part 11 determines whether or not the user of the preceding job and the user of the present job are identical (Step s26). The discharge decision processing part 11 makes it possible to compare user information regarding the preceding job with user information regarding the present job. To do this, the discharge decision processing part 11 may acquire user information from job information whenever a job is executed and hold the acquired user information. Alternatively, the discharge decision processing part 11 may acquire both user information of the preceding job and the present job from a job history.

If the user of the preceding job and the user of the present job are identical (YES in Step s26), this routine is terminated. The reason is that the residual printed matters of the preceding job and the printed matters of the present job are collected by the same user who inputs the preceding and present jobs.

If the user of the preceding job and the user of the present job are different (NO in Step s26), the user of the present job collects, in addition to his/her own printed matters, someone else's printed matters. Thus, the discharge decision processing part 11 alarms that printed matters are taken superfluously via the alarm sound and/or alarm lamp (Step s27), and this routine is terminated.

If all the printed matters have not been collected from the in-body discharging tray 190 (No in Step s24), the discharge decision processing part 11 determines whether or not the residual printed matter flag is ON (Step s28).

If the residual printed matter flag is ON (YES in Step s28), the discharge decision processing part 11 regards the residual printed matter as a printed matter that has been discharged in the preceding job. Then, the delivery decision processing part 1 determines whether or not the user of the preceding job and the user of the present job are identical (Step s29). If the user of the preceding job and the user of the present job are different (NO in Step s29), the control terminates this routine. The reason is that the user of the present job treats the printed matters of the present job with the printed matters thereof left.

To the contrary, if all the printed matters are being left and concurrently the residual printed matter flag is not ON (NO in Step s28) or if the user of the user of the preceding job and the user of the present job are identical (YES in Step s29), resulting in that the user of the present job forgets to collect the printed matters. Thus, the discharge decision processing part 11 alarms the printed matter being left via the alarm sound and/or alarm lamp (Step s30).

Next, the discharge decision processing part 11 determines whether or not the forced termination instruction is issued (Step s31). If the forced termination instruction is issued (YES in STEP s31), the discharge decision processing part 11 terminates this routine. On the other hand, if the forced termination instruction is not issued (NO in STEP s31), the process from STEP s24-s31 is repeated. Incidentally, immediately upon termination of this routine, the camera 4 also terminates its photographing operation.

As described above, the image forming apparatus 100 photographs or captures an image inside the in-body discharging tray 190. The image forming apparatus 100 determines a condition of the printed matter (fold-up, printed on used paper, being left, superfluous collection). The image forming apparatus 100, based on the determination result, will take an action (alarm, indication, discharge-stop, no-action). Thus, when the printed matter is discharged in a fold-up condition or is in an on-used-paper printing, the image forming apparatus 100 issues an alarm, makes an indication on the operation panel, stops the discharging, or the like. Then, the image formation apparatus 100 is capable of making a confirmation whether a used paper is accommodated unexpectedly in each of the cassettes 161a-161d or making repeats of printing. In addition, if no hand of the user is detected, based on captured image information, within a time duration that elapses from the completion of the printing matter discharge, the image forming apparatus 100 may inform the user of the printed matter being left by way of alarm sound and/or alarm lamp and/or other means. Thus, according to the present exemplary embodiment, even though the user locates a relatively distant place from the image forming apparatus 100, the image forming apparatus 100 allows the user to recognize the residual of printed matter. Therefore, it is possible to prevent a possible overflow of printed matters being left in a stacked manner in the in-body discharging tray 190.

Further, after all the printed matters have been removed from the in-body discharging tray 190, the image forming apparatus 100 determines whether or not the resulting printed matters include the printed matters of the preceding and present jobs. If the result is true that both of them is included, a determination is made whether or not the user of the preceding job is identified with the user of the present job. If the result is false that is the user of the preceding job is not the user of the present job, the image forming apparatus 100 alarms that the printed matters are taken too much. Thus, the image forming apparatus 100 allows the user to recognize that he/she collects someone else's printed matters.

In a case where all the printed matters have not be removed from the in-body discharging tray 190, the image forming apparatus 100 determines whether or not the resulting printed matters include both the printed matters of the preceding and present jobs. In a case where only the printed matters of the present job is being left or in a case where the user is the same between the preceding and present jobs despite of the residual printed matters being discharged in both the preceding job and the present job, the image forming apparatus 100 alarms the residual of printed matter. Thus, the image forming apparatus 100 allows the user to recognize that the printed matter is being left.

In summary, sometimes discharged printed matters include a fold-up paper or a used paper. In addition, a user may forget to collect or leave the discharged printed matters. In such a latter, sometimes, another user who collects subsequent printed matters may collect someone else's printed matters as well as his/her printed matters. Unfortunately, in the traditional technology, the user is compelled to inspect the condition of the discharged printed matters in a sheet-by-sheet manner, which make it difficult to solve the problem causes at a discharge part in quick, effective manner.

On the contrary, the present disclosure allows for solving the aforementioned problem in quick, effective manner.

The present disclosure is not limited to the exemplary embodiments as described above and therefore it is possible for the skilled person in the art to vary or modify the same in various ways without departing from the spirit of the present disclosure.

For example, not only the printed matters that are to be discharged into the in-body discharging tray, the present disclosure may be applied to printed matters that are to be discharged into a discharging tray that is provided at a side or other portion of the image forming apparatus 100. In such a case, the camera 4 may be located in such manner that allows the camera 4 to focus the aforementioned discharging tray from an upper position.

Further, the delivery space 191 into which the printer matter are to discharged may be provided with a sensor that is capable of detecting a user's hand and/or a sensor that is capable of detecting the printed matter that has been discharged into the in-body discharging tray 190. In such a case, after discharging the printed matters of the present job, the discharge decision processing part 11 makes a decision based on the sensor provided at the delivery space 191, not the captured image information by the camera 4. In brief, it may be possible for the discharge decision processing part 11 to determine whether or not the user's hand is detected and/or all the printed matters have been removed.

What is claimed is:

1. An image formation apparatus, comprising:
   a discharge part configured to place therein a discharged printed matter;

a camera configured to capture an image of a stacking side of the discharge part; and a delivery decision processing part configured to determine a condition of the printed matter placed in the discharge part based on the image captured by the camera, the delivery decision processing part being configured to take a specified action in response to a result of the determination, wherein the delivery decision processing part takes the specified action if the delivery decision processing part detects, based on the image captured by the camera, that the printed matter is in a fold-up condition.

2. The image forming apparatus according to claim 1, wherein the specified action is selectable from any one of alarm sound generation, alarm light lighting, discharge termination, and operation-panel indication.

3. An image formation apparatus, comprising:

a discharge part configured to place therein a discharged printed matter;

a camera configured to capture an image of a stacking side of the discharge part; and a delivery decision processing part configured to determine a condition of the printed matter placed in the discharge part based on the image captured by the camera, the delivery decision processing part being configured to take a specified action in response to a result of the determination, wherein the delivery decision processing part takes the specified action if the delivery decision processing part detects, based on the image captured by the camera, that the printed matter is a result of printing on a used paper.

4. An image formation apparatus, comprising:

a discharge part configured to place therein a discharged printed matter;

a camera configured to capture an image of a stacking side of the discharge part; and a delivery decision processing part configured to determine a condition of the printed matter placed in the discharge part based on the image captured by the camera, the delivery decision processing part being configured to take a specified action in response to a result of the determination, wherein the delivery decision processing part takes the specified action if the delivery decision processing part detects, based on the image captured by the camera, that the printed matter is being left.

5. An image formation apparatus, comprising:

a discharge part configured to place therein a discharged printed matter;

a camera configured to capture an image of a stacking side of the discharge part;

a delivery decision processing part configured to determine a condition of the printed matter placed in the discharge part based on the image captured by the camera, the delivery decision processing part being configured to take a specified action in response to a result of the determination; and an information processor that determines whether a user of a previous print job is the same as a user of a present print job, wherein the delivery decision processing part takes the specified action if:

the information processor determines that the user of the preceding job is not the same as the user of the present print job, and the delivery decision processing part detects, based on the image captured by the camera, that the printed matter has been removed from the discharge part, and the printed matter includes printed matter from the preceding print job.

* * * * *